United States Patent [19]

Takeuchi

[11] 4,294,166
[45] Oct. 13, 1981

[54] APPARATUS FOR MIXING AND BAKING OF BREAD

[76] Inventor: Shigeo Takeuchi, 2-banchi, Kiba-cho, Minato-ku, Nagoya-shi, Aichi-ken, Japan

[21] Appl. No.: 157,189

[22] Filed: Jun. 6, 1980

Related U.S. Application Data

[62] Division of Ser. No. 933,116, Aug. 9, 1978, Pat. No. 4,234,605.

[30] Foreign Application Priority Data

Aug. 19, 1977 [JP] Japan .............................. 52/99833

[51] Int. Cl.³ .......................... B01F 7/24; A47J 27/00
[52] U.S. Cl. ......................................... 99/348; 366/97
[58] Field of Search ................. 99/348, 340, 409, 421, 99/423, 427, 443 R, 447; 219/389, 405; 366/237, 70, 69, 97; 426/18, 549, 551, 504, 506

[56] References Cited

U.S. PATENT DOCUMENTS

| | | | |
|---|---|---|---|
| 3,169,493 | 2/1965 | Enoch | 366/70 |
| 3,635,147 | 1/1972 | Lee | 99/348 |
| 3,825,234 | 7/1974 | Ruffinatti | 366/70 |
| 4,137,835 | 2/1979 | Petersen | 99/348 |

*Primary Examiner*—Robert W. Jenkins
*Attorney, Agent, or Firm*—Haseltine and Lake

[57] ABSTRACT

A breadmaking method and apparatus particularly adapted for household use. A combined trough and baking-pan unit is removably mounted on a lift table arranged in the oven and, when raised, is automatically covered by a downwardly spring-biased closure member and receives a measured amount of water as allowed to fall down through the bottom port of a water tank provided above and through holes formed in the closure member. Also provided are agitator means which are operable to act upon the mixture in the combined trough and baking pan unit raised. For fermentation and degassing of the dough thus formed in the unit, the lift table is lowered to its bottom position and held there for an appropriate length of time and thereafter the oven temperature is raised to a suitable level. The oven heater can also serve to heat the water held in the tank preliminarily to an optimum temperature and thus enables any inexperienced person to make palatable bread at all seasons independently of the external atmospheric temperature with ease.

6 Claims, 10 Drawing Figures

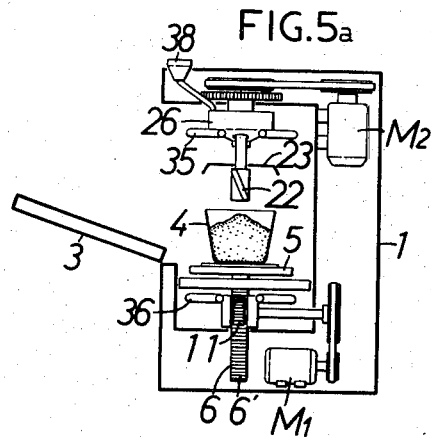
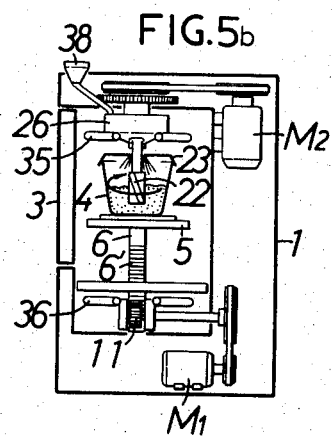
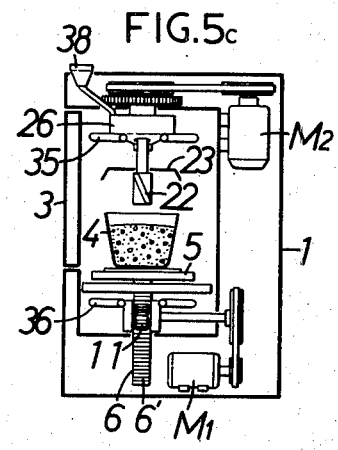
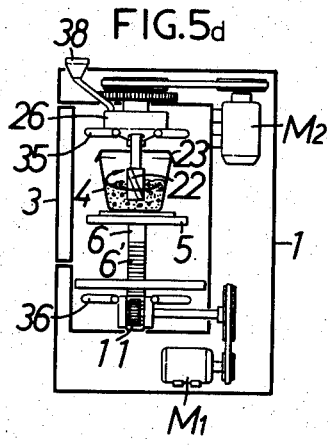
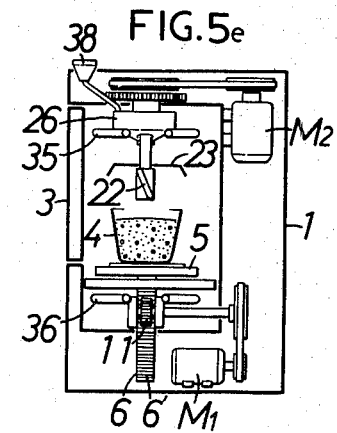
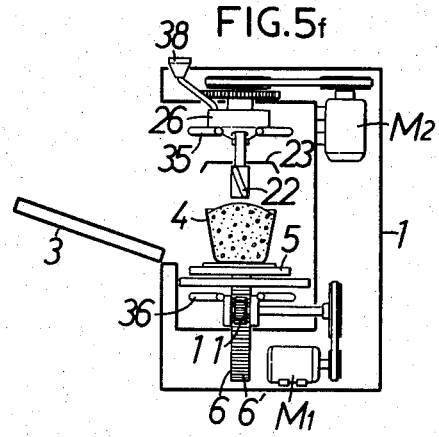

APPARATUS FOR MIXING AND BAKING OF BREAD

This is a division of application Ser. No. 933,116 filed Aug. 9, 1978, now U.S. Pat. No. 4,234,605 issued Nov. 11, 1980.

BACKGROUND OF THE INVENTION

This invention relates to bread-making methods and apparatus and more particularly to those of the type designed to make it possible for ordinary people to make palatable bread with ease and efficiency.

Generally, in breadmaking, the flour and other ingredients needed are mixed with water and carefully kneaded for a substantial length of time to form a dough, which is subjected to fermentation and degassing several times before it is finally baked. The kneading and other processes require not only much time and labor but also considerable skill. Because of this, it has usually been difficult for ordinary inexperienced people to make bread successfully at home.

SUMMARY OF THE INVENTION

Under this situation, the present invention has for its primary object the provision of a novel breadmaking method and an apparatus therefor which are particularly suitable for domestic use, enabling any people to make tasty bread at home with extreme ease and convenience and to take bread hot fromt the oven whenever desired.

Another object of the present invention is to provide a breadmaking method of the character described which is designed to perform the dough kneading, fermenting, degassing and baking processes at all times under the same conditions irrespective of the external atmospheric temperature varying from season to season and in different localities and an apparatus for carrying out such method which is simple in construction.

A further object of the present invention is to provide a breadmaking apparatus of the character described which is capable of heating the dough uniformly throughout the entire mass thereof.

Yet another object of the present invention is to provide a breadmaking apparatus of the character described which is also usable like any conventional cooking oven for baking or roasting any of different cooking items as well as for mixing and kneading such item in a separate step or in a continuous process including a baking or roasting step.

A further object of the present invention is to provide a breadmaking apparatus of the character described which is capable of light and quiet operation with a minimum of vibration.

The above and other objects and advantages of the present invention will become apparent from the following detailed description when taken in conjunction with the accompanying drawings.

BRIEF DESCRIPTION OF THE DRAWINGS

In the drawings:

FIGS. 5a to 5f schematically illustrate the successive steps of the breadmaking method of the present invention.

DESCRIPTION OF THE PREFERRED EMBODIMENT

Figure 1:
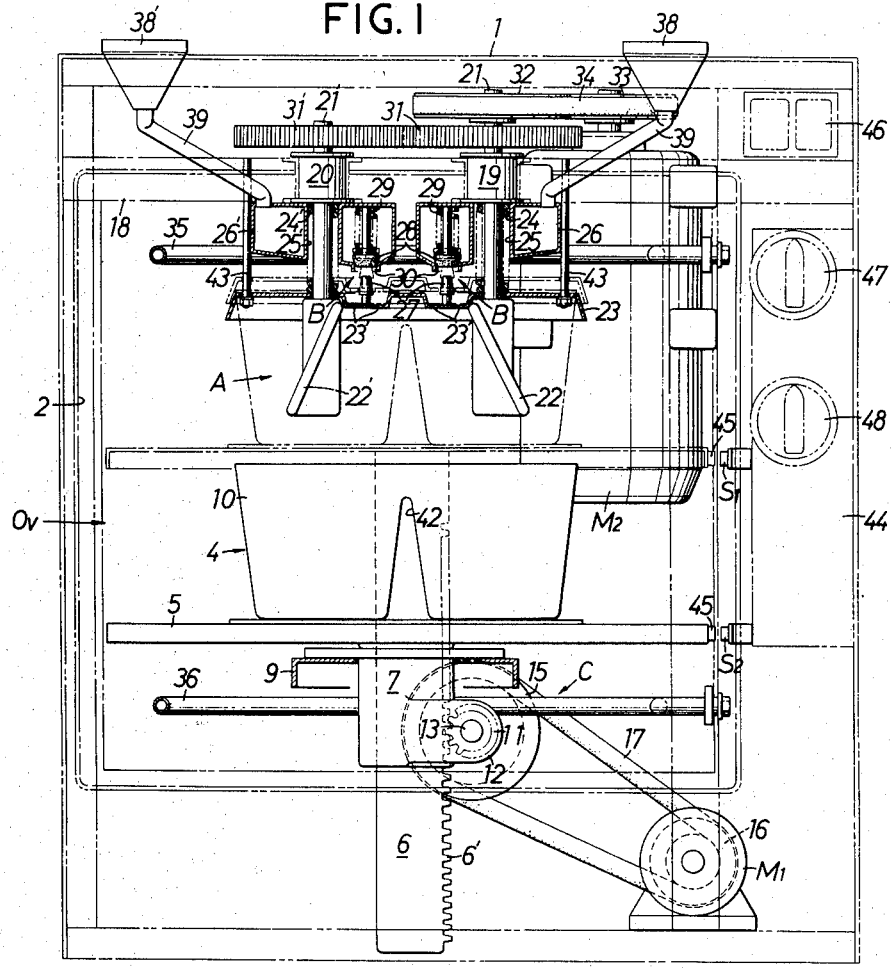
FIG. 1 is a front elevational view of a preferred form of breadmaking apparatus embodying the principles of the present invention.
Figure 2:
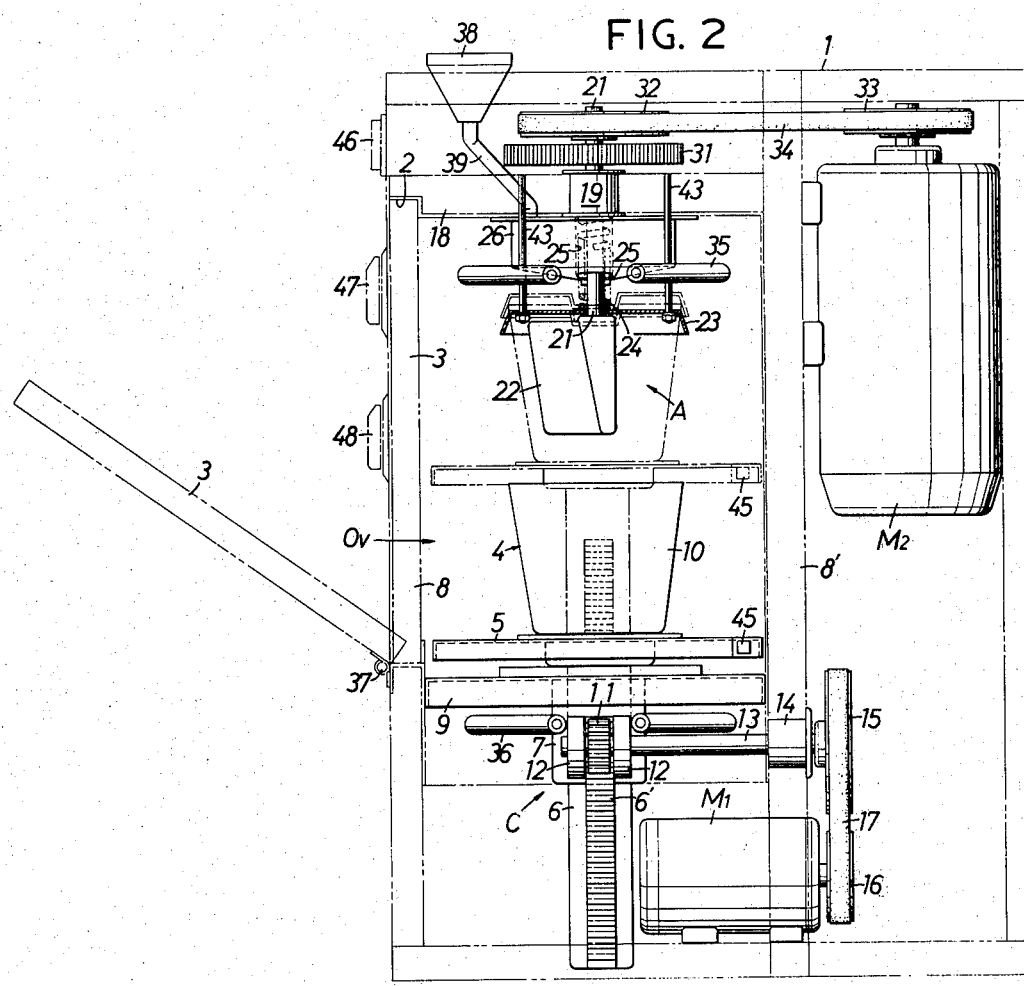
FIGS. 2 and 3 are a side and a plan view, respectively, of same.
Figure 3:
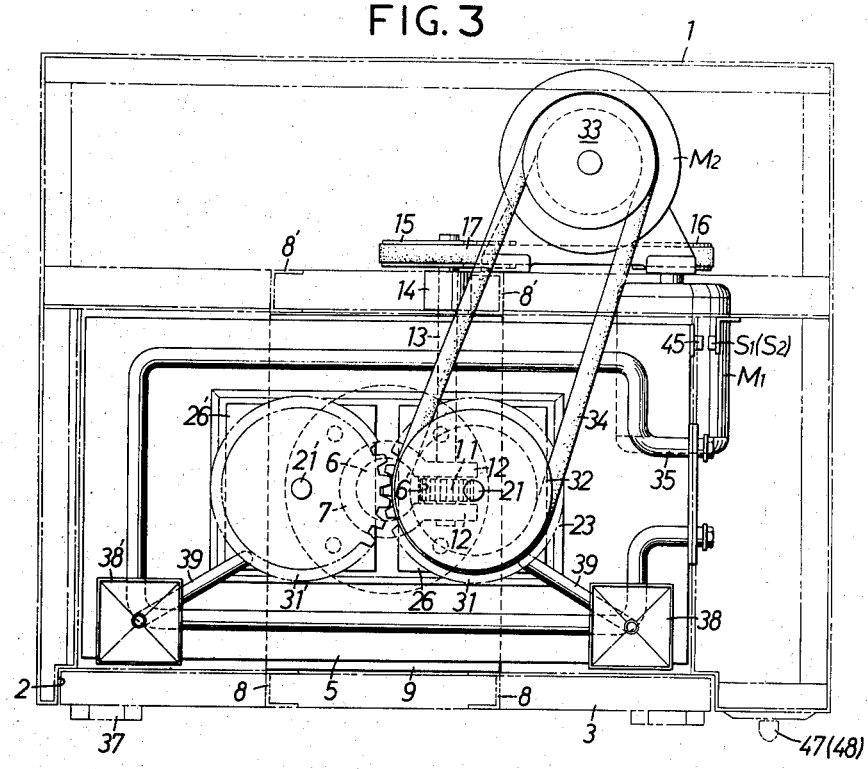

Referring to the drawings and first to FIGS. 1, 2 and 3, which illustrate one preferred form of breadmaking apparatus embodying the present invention. The apparatus shown has a casing frame 1 of rectangular construction which has an access opening 2 formed in its front face and a door 3 pivoted to the bottom edge of the front opening 2 as at 37 for manual opening and closing movement. Accommodated in the casing frame 1 centrally thereof is an oven Ov which is secured thereto and has its front face placed in facing relation to the access opening 2 of the casing frame 1. Fixed to the casing frame 1 at its bottom are vertical columns 8 and 8' with a horizontal beam 9 fixed therebetween. A tubular guide member 7 is fixed to the underside of the horizontal beam 9 at the middle thereof by a plurality of fastening bolts, not shown. Freely slidably fitted through the tubular guide 7 is a vertical support rod 6 which is formed on one side thereof with an integral rack 6'. Fixedly mounted on the support rod 6 at the top end thereof is a lift table 5 which is rectangular in shape and vertically movable within the oven Ov, as will be described below.

The tubular guide member 7 is formed on one side thereof with a pair of spaced parallel bearing lugs 12 which rotatably support a pinion drive shaft 13 in a horizontal position in cooperation with a bearing 14 provided on the casing frame 1. A pinion 11 is fixedly mounted on the drive shaft 13 between the paired lugs 12 and held in mesh with the rack 6' of support rod 6. Secured to one end of the pinion drive shaft 13 which extends outwardly beyond the bearing 14 is a driven V-belt pulley 15 which is drivably connected with a driving pulley 16 by means of a V-belt 17. The driving pulley 16 is secured to the output shaft of a first prime mover $M_1$ which is arranged within the casing frame 1 at the bottom thereof, as shown. Upon operation of the first prime mover $M_1$, the pinion drive shaft 13 is driven to rotate the pinion 11, which is in mesh with the rack 6' on the support rod 6, thereby to vertically move the latter 6 with the table 5 thereon. The cited members including lift table 5, support rod 6, rack 6', tubular guide 7, pinion 11 and pinion drive shaft 13 jointly form a lift device C of the apparatus illustrated.

Figure 4:
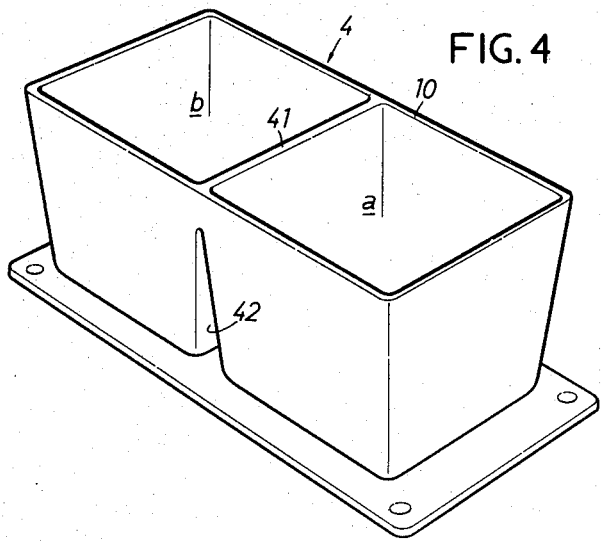
FIG. 4 is an enlarged perspective view of the combined trough and baking-pan unit shown in FIGS. 1 and 2.

Removably mounted on the lift table 5 is a combined trough and baking-pan unit 4 which takes the form of an open-top vessel 10 of rectangular cross section which is divided into two compartments a and b by a partition wall 41, as is clearly shown in FIG. 4. The partition wall 41 is bifurcated in cross-sectional shape to form therein a downwardly open space 42, which helps enable the compartments a and b to be externally heated in an uniform manner.

Mounted on the casing frame 1 at the top thereof is a horizontal beam 18 on which a pair of vertically extending agitator shafts 21 and 21' are rotatably supported in laterally spaced relation to each other by means of respective bearings 19 and 20, which are fitted in the horizontal beam 18. Fixed to the agitator shafts 21, 21' at the bottom thereof are respective agitator blades 22 and 22'. These agitator blades are located immediately above the combined trough and baking-pan 4 and, as will be described later, are inserted into the respective compartments a and b of the combined trough and baking-pan 4 upon upward travel of the latter for agitating and kneading operation therein. The agitator shafts 21, 21' and agitator blades 22, 22' jointly constitute an agitating device A of the apparatus. Incidentally, the bottom portions of two agitator shafts 21 and 21', the agitator blades 22 and 22' and the interior surfaces of the combined trough and baking-pan 4 are all desirably Teflon-coated. A closure member 23 for covering the open top of the combined trough and baking-pan 4 is fitted over the paired agitator shafts 21, 21' in a position above the respective agitator blades 22, 22' for vertical movement relative thereto and is slidably supported on a plurality of support posts 43 suspended from the horizontal beam 18. Reference numeral 24 indicates coiled springs arranged between the horizontal beam 18 and closure member 23 around the respective agitator shafts 21, 21' so tht the closure member 23 is normally held against the enlarged bottom ends of support posts 43 under the downward bias of the coiled springs 24. With this arrangement, it is to be noted that, upon upward travel of the combined trough and baking-pan 4, the closure member 23 is placed in close contact with the top edge of such combined trough and baking-pan 4 and more or less raised against the bias of coiled springs 24 to resiliently close the open top of the combined trough and baking-pan 4 so that subsequently when the bread ingredients charged therein are agitated there is no danger of the powdery materials being scattered about exteriorly of the combined trough and baking-pan 4.

Fixed to the underside of the roof wall of oven Ov immediately above the closure member 23 are a pair of water tanks 26 and 26' each formed with a vertically extending through passage 25 or 25' centrally thereof, and through which passeges the respective agitator shafts 21 and 21' vertically extend. The water tanks 26 and 26' are funnel-shaped at the bottom and formed in the bottom center with respective water outlet ports 30, each of which is normally closed by a plug member 28 under the bias of coiled spring 29. On the other hand, the closure member 23 is provided thereon with a pair of upward projections 27 at locations immediately below the respective water outlet ports 30 so that, when the closure member 23 is raised upon upward travel of the combined trough and baking-pan 4, the projections 27 act to push up the respective plug members 28 thereby to allow the hot water held in the water tanks 26, 26' to run down through the now opened water outlet ports 30. The water thus released from the water tanks is directed through holes 23' formed in the closure member 23 around the projections 27 into the combined dough and baking-pan unit 4. In this embodiment, the projections 27, plug members 28, spring means 29 and water outlet parts 30 together form a water delivering device B of the apparatus. In addition, the water tanks 26, 26' are themselves arranged so as to be fed with water through respective water inlet pipes 39 and 39', which are connected to the bottom of hoppers 38 and 38' supported on top of the casing frame 1.

Fixedly mounted on the top ends of agitator shafts 21, 21', which extend upwardly through the top wall of oven Ov, are a pair of meshing transmission gears 31 and 31', as clearly shown in FIG. 1. Further, a driven V-belt pulley 32 is fixed to the extreme top end of one of the two agitator shafts, 21, and drivably connected with a driving V-belt pulley 33 which is fixedly mounted on the output shaft of a second prime mover $M_2$, which in turn is mounted on one of the columns, 8', of the casing frame 1. With this arrangement, it will be readily noted that upon operation of the second prime mover $M_2$ the two agitator shafts 21, 21' are driven to rotate in directions opposite to each other.

A pair of upper and lower heaters 35, 36 are arranged in the oven Ov at respective levels above and below the combined trough and baking-pan unit 4 and the lift table 5, and connected to the electric circuit of a control board 44 provided in the casing frame 1.

Arranged on the inside of one side wall of oven Ov are a pair of upper and lower proximity switches $S_1$ and $S_2$ while an actuator 45 is secured to the adjacent side edge of lift table 5 for cooperation with the proximity switches $S_1$ and $S_2$. In the drawings, reference numeral 46 indicates pushbutton switches; 47, a timer switch; and 48, a switch for temperature fine adjustment use.

Description will next be made of the process of making bread according to the present invention with reference to FIGS. 5a to 5f.

First, as shown in FIG. 5a, the front door 3 is manually swung open and a measured amount of breadmaking material is thrown into the combined trough and baking-pan unit 4. The breadmaking material generally includes such ingredients as high-protein flour, milk, sugar, shortening, baking powder, salt and activated powdery yeast, and is usually available in the form of a pre-mixture of such powder materials. Subsequently, a predetermined measured amount of water is poured into the hoppers 38, 38' and, passing through the water inlet pipes 39, 39', is stored in the water tanks 26, 26'. Now, the front door 3 is closed ready for the breadmaking operation. In this starting stage, it is to be noted that the breadmaking material of powder form, separately held in the combined trough and baking-pan 4 with no water added, can be left long to stand therein with no resulting change in quality.

Subsequently, the upper and lower heaters 35 and 36 are energized so that the temperature within the oven Ov is raised to 25° C. or thereabout and such oven temperature is maintained by appropriate thermostat means. When such oven temperature has been reached, the first prime mover $M_1$ is started manually or automatically by timer operation to turn in a forward direction.

Under the forward drive of first prime mover $M_1$, the driving V-pulley 16, V-belt 17 and driven V-pully 15 are driven to rotate forwardly to raise the support rod 6 through the intermediary of the pinion 11 and rack 6'. In this manner, the lift table 5 on top of the support rod 6 is raised together with the combined trough and baking-pan unit 4 mounted thereon so that the agitator blades 22, 22' are inserted into the respective baking molds or compartments a and b of the rising combined trough and baking-pan unit 4 and, simultaneously with this, the open top end of the unit 4 comes into engaement with the closure member 23. The combined trough and baking-pan unit 4 thus covered is further raised a slight distance (of aproximately 1 cm.) together with the closure member 23 against the bias of coiled springs 24, 24' with the result that the plug members 28, 28' in the respective water tanks 26, 26' are pushed up by the respective upward projections 27 on the closure member 23 to allow the water, held in the water tanks 26, 26' and at the same temperature as that of the oven interior, to flow through the now open water outlet ports 30 and the holes 23', formed in the closure member 23, down into the combined trough and baking-pan unit 4. When the lift table 5 reaches its top position, the actuator 45 carried thereon actuates the upper proximity switch $S_1$ so as to de-energize the first prime mover $M_1$ while energizing the second prime mover $M_2$. As the result, the lift table 5 is left in its top position and the two agitator shafts 21, 21' are started to rotate in directions opposite to each other through the intermediary of driving V-pulley 33, V-belt 34, driven V-pulley 32 and transmission gears 31, 31'. Under the effect of the agitator blades 22, 22', thus rotating in directions opposite to each other in the combined trough and baking-pan unit 4, the mixture of ingredients and water in the latter is agitated and kneaded to form a dough (FIG. 5b). It is to be noted that, during the agitating and kneading operation of about 20 minutes, the mixture of ingredients and water is held all the time at about 26° C. irrespective of the external atmospheric temperature and is sufficiently agitated and kneaded to form a soft, fair-skinned dough.

At the end of such agitating and kneading operation, the second prime mover $M_2$ is de-energized manually or automatically by timer operation and at the same time the first prime mover $M_1$ is again started this time in reverse direction. According to this, the lift table 5 is started to descend with the combined trough and baking-pan unit 4 carried thereon and, when the table 5 reaches its bottom position, the actuator 45 mounted thereon actuates the lower proximity switch $S_2$ to de-energize the first prime mover $M_1$, thus causing the table 5 to stop and rest in the bottom position. With the descent of the lift table 5 and the combined trough and baking-pan unit 4, the agitator blades 22, 22' are extracted from the latter 4 and the closure member 23 is released therefrom to descend under the bias of the coiled springs 24, 24' so that the plug members 28 are restored to close the respective water outlet ports 30 under the bias of the coiled springs 29. After the descent of lift table 5, the entire apparatus is left to stand still for about 40 minutes with the oven temperature maintained at about 38° C. During this time, the dough in the combined trough and baking-pan unit 4 is subjected to primary fermentation with yeast ripening to a full extent and is expanded to approximately 2.0 to 2.5 times its original volume, with formation of gluten membranes therein (FIG. 5c).

At the point of time at which the primary fermentation has been fully effected, the first prime mover $M_1$ is again energized manually or automatically by timer operation to cause the lift table 5 to rise. When the lift table 5 reaches its top position, again the actuator 45 operates the upper proximity switch $S_1$ to cause the lift table 5 to stop and rest in its top position and, after the lapse of time of a few seconds, the second prime mover $M_2$ is again energized. In this manner, as with the case of the initial dough kneading operation previously described, the dough expanded by primary fermentation is kneaded again by the agitator blades 22, 22' to let off the gases held in the dough into the atmosphere. With this agitation continued for about fifteen seconds, the dough is degassed nearly completely to shrink back to its original volume (FIG. 5d).

Upon completion of the degassing operation, the second prime mover $M_2$ is de-energized manually or automatically by timer operation and at the same time the first prime mover $M_1$ is started in reverse direction again to lower the lift table 5. At the instant when the lift table 5 reaches its bottom position, the lower proximity switch $S_2$ is operated by the actuator 45 to de-energize the first prime mover $M_1$ for secondary fermentation, which proceeds in substantially the same manner as the first fermentation previously described (FIG. 5e). During the period of secondary fermentation, the temperature within the oven Ov is also maintained at about 38° C.

At the end of the period of secondary fermentation, of about 40 minutes, the current rate of the upper and lower heaters 35, 36 provided in the oven Ov is increased so as to raise the oven temperature to about 190° C. to start baking the dough secondarily fermented. After the lapse of time of about 45 minutes, the upper and lower heaters 35, 36 are de-energized and the baked product is left to cool down slowly over a length of time of about 15 minutes. Subsequently, the front door 3 is manually swung open (FIG. 5f) and the combined dough and baking-pan unit 4 is removed from the lift table 5 to the exterior of the apparatus to complete the whole of the breadmaking process. Finally, the combined trough and baking-pan unit 4 is reversed upside down and the bread baked is dumped therefrom.

It will be appreciated from the foregoing that the present invention enables any person to make bread with extreme ease and efficiency as the steps required therefor, including the mixing of the ingredients with water, dough making or kneading the mixture, first and second fermentations, and degassing the fermented dough, are all carried out mechanically in an oven without any need for removing the mixture material or the dough therefrom. Also, the process of breadmaking is quite desirable from the sanitary standpoint as during the process there is no hand touch with the materials once placed in the oven or the dough formed therein.

Further, in order to obtain palatable bread at all seasons, the temperature of water as added to the mixture material should preferably be fixed at a definite level irrespective of the external atmospheric temperature. According to the present invention, such temperature requirement can be satisfactorily met as the water is heated beforehand to substantially the same temperature as that of the oven interior or of the mixture material therein and this makes it possible to obtain palatable bread at all times irrespective of the external atmospheric temperature without necessitating therefor any heater means additional to the oven heater.

Further, according to the present invention, the whole breadmaking process can be performed in a much reduced period of time with no trouble of transferring the dough formed into a baking mold or pan, as conventionally required, since in the process breadmaking materials are mixed and kneaded in the combined trough and baking-pan unit and the dough formed is left therein for fermentation, degassing and baking operation.

Moreover, in the apparatus of the present invention are arranged, as described herein, an agitating device, which is fixed in the top portion of the casing frame of the apparatus, and a lift table, which lies under the agitator device and is vertically movable with the combined trough and baking-pan unit removably mounted thereon so that the agitator blades are inserted into and extracted from the combined trough and backing-pan unit as the lift table is moved vertically upward and downward. With this arrangement, it will readily be recognized that baking or roasting operation of any cooking items can also be effected on the lift tables as in any conventional form of oven without any interference from the agitator means as long as the lift table is held in its bottom position. Also, with this arrangement, any cooking item held in the combined trough and baking-pan unit can be mixed or kneaded efficiently by the agitating device, as desired, only with the lift table raised and the agitator blades inserted in the combined trough and baking-pan unit. After all, with the apparatus of the present invention, agitating, kneading and roasting operations required on any cooking items can be effected separately or continuously in an automatic fashion, as desired, and it will be appreciated, therefore, that the present invention has wide range of applications in cookery in general and is highly valuable for its convenience particularly in household use.

Further, as the combined trough and baking-pan unit is divided, as illustrated, into a plurality of compartments and the partition wall therebetween is bifurcated in cross-sectional shape to form an open space therein. In this structure, each of the compartments can be heated uniformly around the periphery thereof, thus enabling the dough formed therein to be heated to one and the same temperature throughout the entire mass thereof to form a well-baked and palatable loaf of bread.

Also, in the apparatus of the present invention, the agitating device includes, as illustrated and described before, a pair of parallel agitator shafts carrying respective agitator blades thereon and adapted to be driven to rotate in directions opposite to each other. It will be apparent that, in operation, such agitating device as a whole exerts no torsional effect on the combined trough and baking-pan unit nor any excessive load on the structure supporting the latter, thus enabling the trough and baking-pan unit to be securely held in its predetermined position on the support table. In addition, such agitating device can operate in particularly light and quiet manner as the vibrational effects of the two agitator shafts cancel each other.

In this connection, it is to be noted that, during the agitation period, the combined trough and baking-pan unit is held resiliently clamped between the lift table raised to its top position and the spring-biased closure member placed in close contact with the combined trough and baking-pan unit at its open top end thereof and not only the material being agitated in the unit is effectively prevented from being scattered exteriorly thereof but also vibration of the unit itself is effectively reduced to a minimum.

Further, according to the present invention, water held in the water tanks is directed under gravity into the combined trough and baking-pan unit when the plug members at the bottom of the respective water tanks are lifted by the projections formed on the closure member, which is raised upon upward travel of the lift table, as described. This apparently makes it possible to feed the combined trough and baking-pan unit with a prescribed amount of water automatically without opening the front door of the breadmaking apparatus and thus enables thermally highly efficient operation with no substantial loss of heat from the oven interior.

Though the present invention has been shown and described as embodied for making a pair of loaves at a time, including a combined trough and baking-pan unit divided into two compartments, a pair of water tanks and an agitating device having a pair of parallel agitator shafts, it is to be understood that it is not limited to the details set forth but is usable also for making a single loaf at a time with due modifications made therein. Such and other modifications which do not depart from the spirit of the invention are intended to be included within the scope of the appended claims.

What is claimed is:

1. An apparatus for making bread which comprises a casing frame, an oven accommodated in said casing frame, a combined trough and baking-pan unit removably mounted in said oven, a water tank accommodated in said oven, oven heater means effective to heat water as held in said water tank to the same temperature as that of the oven interior, means for directing the water heated in said water tank into said combined trough and baking-pan unit, an agitating device in said oven having an agitator element, and lift means operable to move said combined trough and baking-pan unit and said agitating device vertically relative to each other thereby to place the agitator element of said agitating device into and out of said combined trough and baking-pan unit.

2. A breadmaking apparatus as set forth in claim 1, in which said combined trough and baking-pan unit is partitioned by walls into a plurality of compartments, each of said walls being bifurcated in cross-sectional shape to form an open space therein.

3. A breadmaking apparatus as set forth in claim 1, in which said agitating device is suspended in the top of said oven, said agitator element comprising a substantially vertically extending agitator shaft and an agitator blade carried at the bottom end thereof, and in which said combined trough and baking-pan unit is detachably mounted on a lift table provided under said agitating device in said oven for vertical movement therein, the arrangement being such that said agitator blade is inserted into said combined trough and baking-pan unit upon upward travel of said lift table and extracted from said combined trough and baking-pan unit upon downward travel of said lift table.

4. A breadmaking apparatus as set forth in claim 3, which further comprises a closure member adapted to cover the open top of said combined trough and baking-pan unit, said closure member being suspended in the top of said oven for limited vertical movement therein and normally biased downwardly by spring means so that, upon upward travel of said lift table, said cover member is placed in close contact with the top edge of said combined trough and baking-pan unit against the bias of said spring means and acts to clamp said combined trough and baking-pan unit against said lift table.

5. A breadmaking apparatus as set forth in claim 4, in which said water tank is formed in the bottom thereof with a water outlet port and provided with a vertically movable plug member normally downwardly spring-biased to seat in said water outlet port and said cover member is provided thereon with an upward projection which acts upon rising movement of said cover member to lift said plug member out of said water outlet port.

6. A breadmaking apparatus as set forth in claim 1, in which said agitator element comprises a pair of parallel agitator shafts adapted to be driven to rotate in opposite directions and a pair of agitator blades respectively carried by said agitator shafts.

* * * * *